| | DIE #1 J X1 | DIE #1 K X2 | DIE #1 L X3 | DIE #1 M X4 | DIE #2 N Y1 | DIE #2 N Y2,Y3,Y4 | | |
|---|---|---|---|---|---|---|---|---|
| 1 | | | | | X | | Y1 | |
| 2 | X | | | | X | | X1 Y1 | |
| 3 | | X | | | X | | X2 Y1 | |
| 4 | X | X | | | X | | X1, X2, Y1 | |
| 5 | | X | X | | X | | X2, X3 Y1 | |
| 6 | X | X | X | | X | | X1, X2, X3 Y1 | |
| 7 | X | | | | | X | X1 Y2, Y3, Y4 | |
| 8 | | X | | | | X | X2 Y2, Y3, Y4 | |
| 9 | X | X | | | | X | X1, X2, Y2, Y3, Y4 | |
| 10 | | X | X | | | X | X2, X3 Y2, Y3, Y4 | |
| 11 | X | X | X | | | X | X1, X2, X3 Y2, Y3, Y4 | |
| 12 | | X | X | X | | X | X2, X3, X4 Y2, Y3, Y4 | |

| | X1 | X2 | X3 | X4 | |
|---|---|---|---|---|---|
| 1 | X | | | | X1 |
| 2 | | X | | | X2 |
| 3 | X | X | | | X1, X2 |
| 4 | | X | X | | X2, X3 |
| 5 | X | X | X | | X1, X2, X3 |
| 6 | | X | X | X | X2, X3, X4 |

INVENTOR
FREDERICK A. HURLEY
BY
Morgan, Finnegan, Durham & Pine
ATTORNEYS

Dec. 12, 1967 F. A. HURLEY 3,357,703

COMBINED CLOCK AND CHANCE DEVICE

Filed Sept. 8, 1964 6 Sheets-Sheet 2

INVENTOR
FREDERICK A. HURLEY
BY
Morgan, Finnegan, Durham & Pine
ATTORNEYS

INVENTOR
FREDERICK A. HURLEY
BY
Morgan, Finnegan, Durham & Pine
ATTORNEYS

INVENTOR
FREDERICK A. HURLEY
BY
Morgan, Finnegan, Durham & Pine
ATTORNEYS

COMBINED CLOCK AND CHANCE DEVICE

INVENTOR
FREDERICK A. HURLEY
BY
Morgan, Finnegan, Durham & Pine
ATTORNEYS

Dec. 12, 1967 F. A. HURLEY 3,357,703

COMBINED CLOCK AND CHANCE DEVICE

Filed Sept. 8, 1964 6 Sheets-Sheet 6

INVENTOR
FREDERICK A. HURLEY
BY
Morgan, Finnegan, Durham & Pine
ATTORNEYS

United States Patent Office 3,357,703

Patented Dec. 12, 1967

3,357,703

COMBINED CLOCK AND CHANCE DEVICE

Frederick A. Hurley, Miami, Fla., assignor to Elliott & Evans, Inc., a corporation of Florida Filed Sept. 8, 1964, Ser. No. 394,761
11 Claims. (Cl. 273—138)

This invention relates to clocks and amusement devices, and more particularly, relates to a combined unit which can be used either as a clock or a coin-operated device.

Needless to say, clocks and timepieces have been in existence for a long time and over the years they have appeared in a virtually unlimited number of different shapes and sizes. Nevertheless, there still remains an existing need for new and unique clocks, particularly clocks for commercial establishments. Amusement games of the coin-operated variety have also been in existence for many years and have appeared in a virtually unlimited variety. Here also, there is a continuing need for new and unique games and amusement devices.

Nearly all of the prior coin-operated amusement devices were of a mechanical nature and therefore required a generally horizontal playing surface. As a result, they required substantial floor space and could be installed in only a limited number of establishments where the money taken in was sufficient to compensate the owner for the loss of floor space. Another disadvantage inherent with the prior amusement devices is the requirement that the player go to the physical location of the amusement device, thereby tending to disrupt normal business operation. Also, the noise associated with the use of prior games would often tend to annoy other customers.

An object is to provide a unique clock which can also be used as part of an amusement device and, if desired, can be coin-operated.

Still another object of the invention is to provide a coin-operated amusement device which requires negligible floor space, can be played from virtually any location within the establishment where installed, and which is not disturbing to other persons in the vicinity.

The display unit portion of the apparatus in accordance with this invention includes two die outlines, each die outline having seven circular transparent areas therein. An electroluminescent panel is positioned behind each of the transparent areas so that, by energizing selected ones of these panels, the dots on a selected face of a die can be simulated. A single die can display anywhere from one to six dots, and therefore the pair of dice shown on the display unit can present indications of one through twelve. Normally, the display unit is operated as a clock and under these conditions the total number of illuminated dots is equal to the hour of the day. The minute indication for the clock is provided by an associated portion of the display unit.

The amusement portion of the system includes a remote control unit having a coin switch and a player actuated switch. The remote control unit is coupled to the main control circuits and the display panel by means of a suitable transmitter-receiver system. When a coin of the proper denomination is deposited to actuate the coin switch, the control apparatus converts from the clock operation to the game operation. Thereafter, each time the player switch is actuated, two random selection circuits are energized which in turn randomly select a number between one and six for each of the die outlines, and thus, simulate a throw of the dice. The control circuits count the number of successive player actuations and after a predetermined number of plays, return the system to the clock operation. Also, if there is a long pause between successive actuations, indicating that the players have probably abandoned the game, the circuits automatically return to the clock operation.

The electrical circuit for making the random selections must be completely random in operation since, if the system favors certain numbers, the result is a "loaded dice" situation which substantially decreases the effectiveness of the game. The particular circuit employed in accordance with this invention includes an electromagnetic relay which is energized while the player switch is actuated, a capacitor discharge circuit which maintains the relay in an energized state for a pre-selected period of time after the player switch is released, a pulse generating circuit for providing electrical pulses at a predetermined rate while the relay is energized, and a digital stepping device which advances one position in response to each pulse. This arrangement has been carefully tested and has been found to give completely random results. The factors believed to contribute to the randomness of operation are (1) the period of operation is partially determined by the length of time during which the player switch is actuated and hence there is always some variation in this period of time; (2) the period of operation is also partially determined by the capacitor discharge time and since the capacitor is never either fully charged or discharged, this contributes another somewhat random variable: (3) the pulse generation rate is such that these relatively small time variations have a significant effect on the number of pulses generated and (4) the portion of the circuit which makes the actual output selection is digital in operation and therefore cannot favor some numbers over other numbers.

The manner in which the foregoing and other objects are achieved in accordance with this invention is described more fully in the following specification which sets forth an illustrative embodiment of the invention. The drawings are part of the specification wherein.

*General description*

Figures 1, 8, 9:
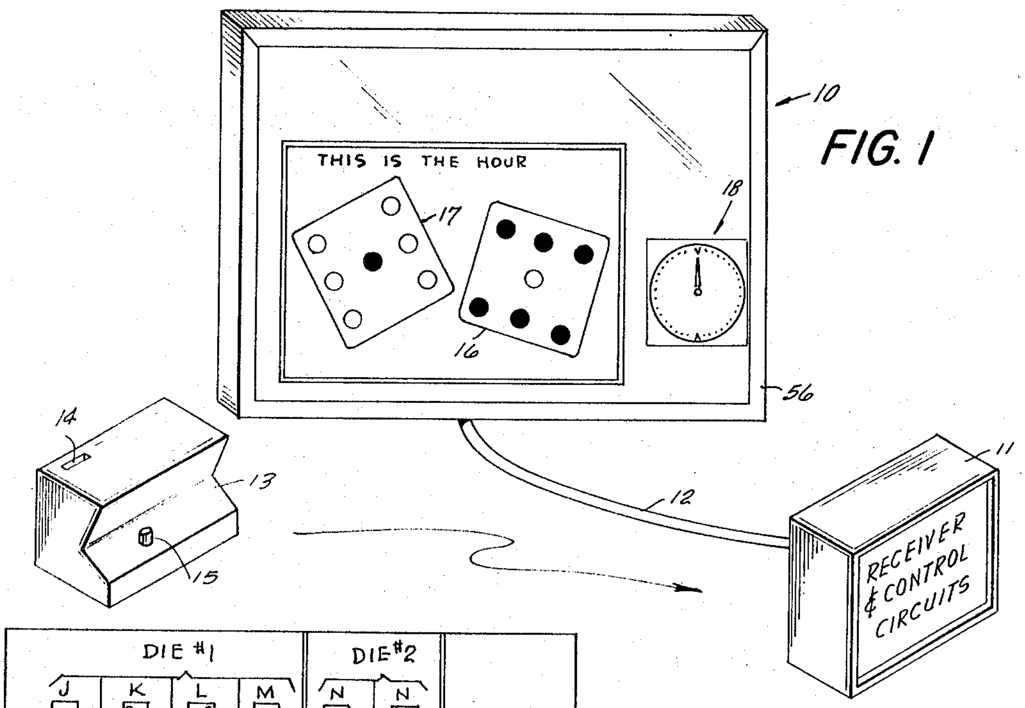
FIG. 1 is a perspective view of the display unit with its associated control circuit unit and remote control unit.
FIG. 8 is a chart indicating which conductors are energized to get various hour displays.
FIG. 9 is a chart illustrating which conductors are energized to get various dice displays.

The apparatus in accordance with this invention includes three principal subassemblies which, as shown in FIG. 1, are a display panel 10, a remote control unit 13, and a receiver and control unit 11. The display panel is a thin and relatively light structure designed so that it can easily be hung on a wall. The display panel presents the outlines 16 and 17 of two die, and includes electroluminescent panels which can be energized to illuminate selected circular areas within the die outline to represent the dots on the face of the dice. Also included is a display panel portion 18 which is part of the clock and provides the minute hand indication.

The remote control unit 13 is housed in a suitable enclosure and includes a coin slot 14 for receiving coins which, if of the proper denomination, actuate the amusement portion of the system. The remote control unit also includes a push button 15 which can be depressed by the player when a new dice display is desired on the display panel. Switches associated with coin slot 14 and push button 15 are coupled to control circuits in unit 11 by a small two channel transmitter which is located within unit 13 and communicates with a suitable receiver in unit 11.

The control circuits within unit 11 include a clock mechanism which normally operates to control the minute hand indication and the number of dots appearing on the dice outline to thereby present the time of day. For example, the display unit as shown in FIG. 1, indicates that it is seven o'clock. In response to a signal from the remote control unit indicating that coins of the proper denomination have been deposited, the control circuits convert from the clock operation to the dice game operation. Thereafter, each time player push button 15 is actuated, the control circuits automatically select a new dice indication which is automatically shown on the display panel.

*Display unit*

The display unit includes a Plexiglas front panel 21 having a permanent design placed on the backside (the side away from the viewer) by means of a suitable process such as silk screening. It is essential that this design include two substantially square outlines 16 and 17 representing the faces of two die. Positioned within each of the die outlines are seven circular transparent areas which, when illuminated, represent the dots on the face of the dice. One of these circular transparent areas is located at the center of the square outline, three of the circular areas are arranged in a row along one side of the square outline, and the remaining circular areas are located along the opposite side of the square outline. Above the dice outline, the words THIS IS THE HOUR appear. The letters of these words each include a dark outline and a transparent center portion.

Figure 5:
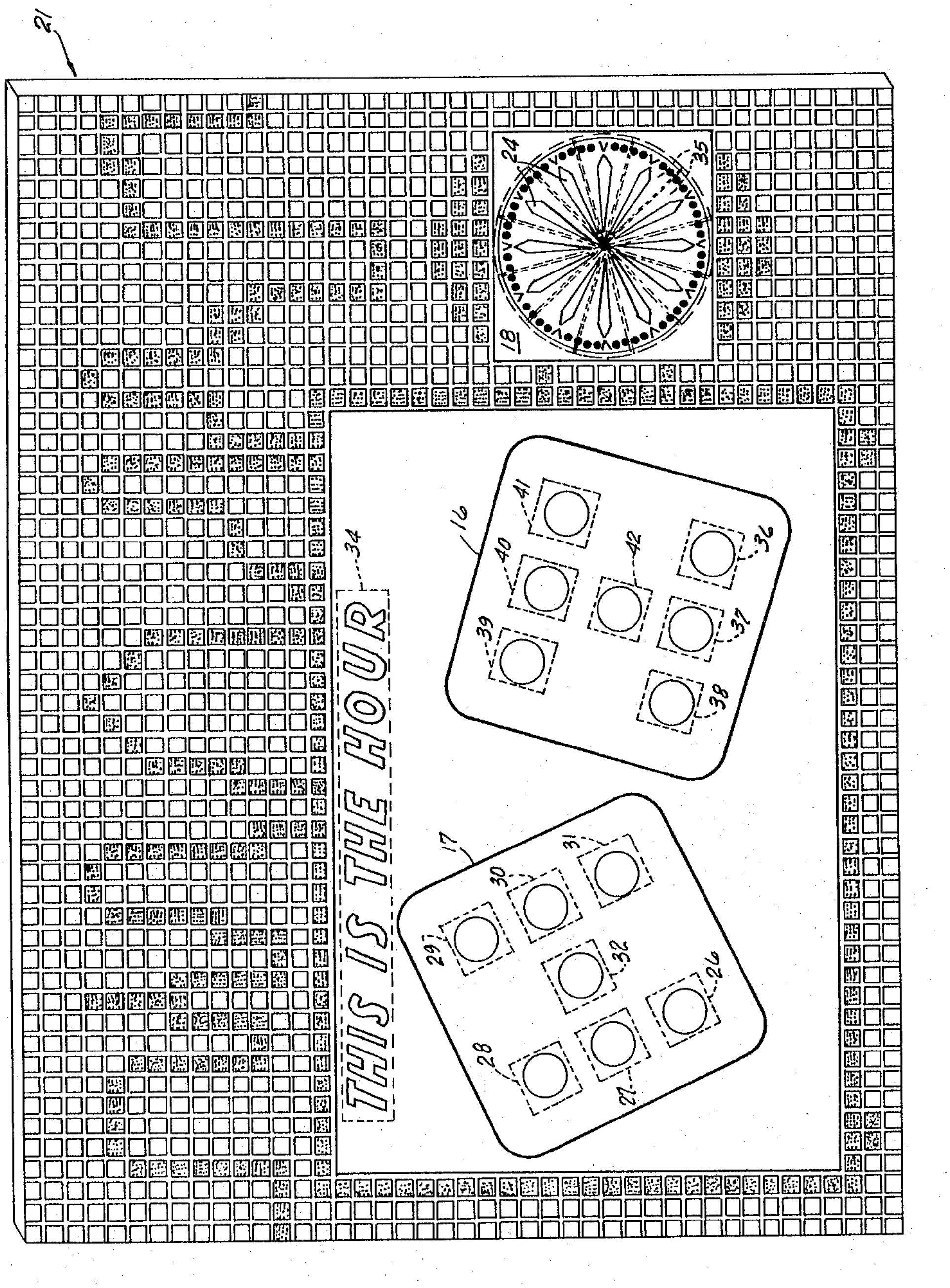
FIG. 5 is a perspective plan view showing the front panel.

Located to the right of the dice outline in FIG. 5 is a radial array of twelve diamond shaped transparent areas 24. These transparent areas are combined with a design representing the face of a clock. The diamond shaped transparent areas represent the twelve possible positions of the minute hand.

Except for the aforementioned transparent areas, the Plexiglas front panel is covered with a suitable opaque coating, preferably a coating silk screened onto the panel. This can be an aesthetically pleasing design as is suggested in FIG. 5 and shown more fully in co-pending design patent application Ser. No. D81,629, filed Sept. 8, 19646 (now Design Patent Des. 202,630) in the name of Frederick A. Hurley.

When the display unit is assembled, there is a separately energizable electroluminescent panel behind each of the individual transparent areas, and thus, selected ones of the transparent areas can be illuminated as desired. For example, with respect to die outline 17, if it is desired to display a one, electroluminescent panel 32 behind the center transparent area is energized; to display a two, electroluminescent panels 26 and 29 behind the transparent areas of diagonally opposite corners are energized; to display a four electroluminescent panels 26, 28, 29 and 31 behind the four corner transparent areas are energized; to display a five, electroluminescent panels 26, 28, 29, and 31 in the corners and electroluminescent panel 32 in the center are energized; and to display a six, electroluminescent panels 26–28 and 29–31 along the sides of the square are energized. The electroluminescent panels 36–42, respectively, associated with die outline 16 are similarly energized selectively to present indications one through six. A single electroluminescent panel 34 is located behind the transparent portion of the words THIS IS THE HOUR. A separately energizable wedge-shaped electroluminescent panel portion 35 is disposed behind each of the transparent areas 24 so that by energizing a selected one of these panels, the minute hand of the clock appears to be at a selected one of the twelve possible positions.

Figures 2, 3, 4:
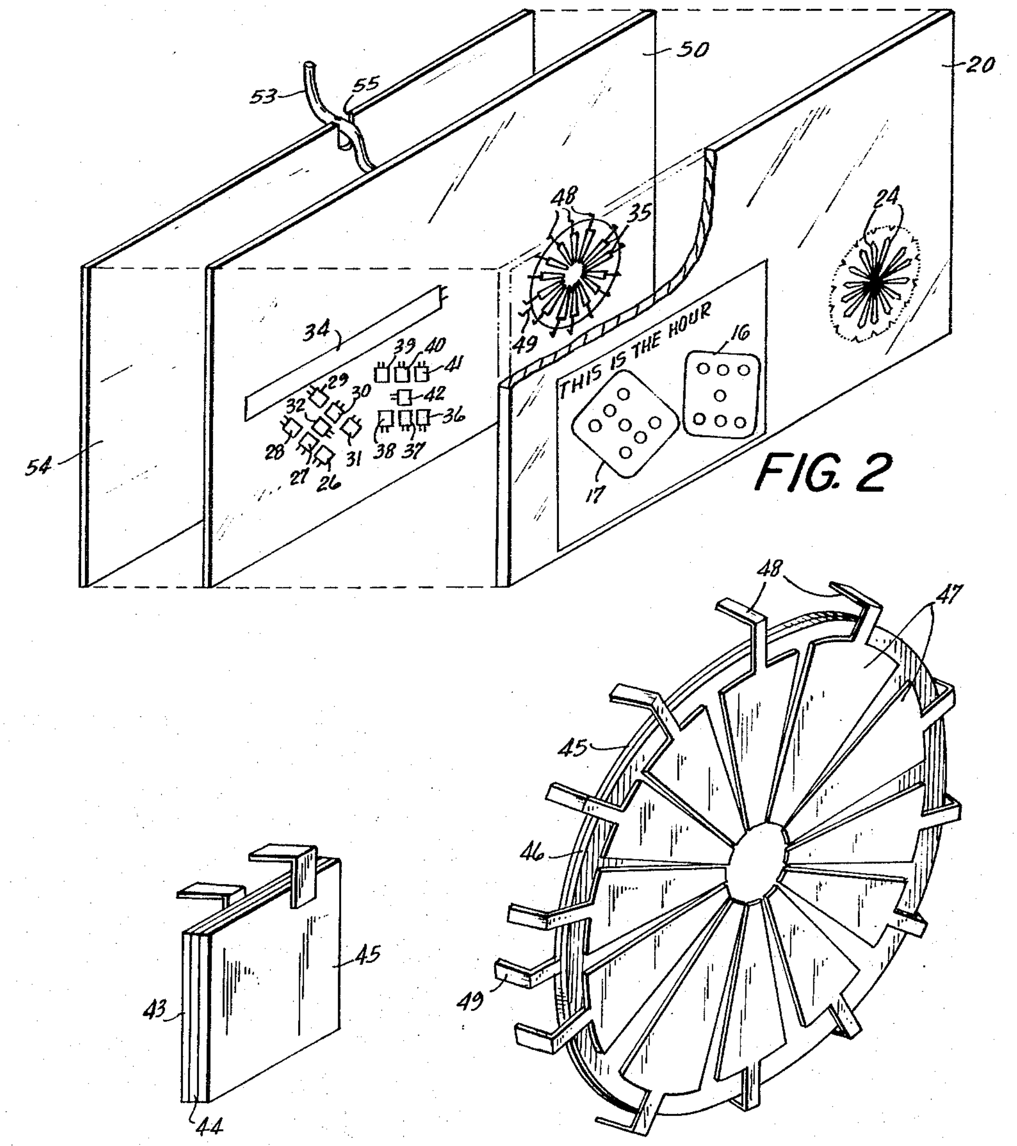
FIG. 2 is a perspective assembly drawing illustrating the maner in which the display unit is assembled.
FIG. 3 is a perspective view of the electroluminescent panel associated with the minute hand indication.
FIG. 4 is a perspective view of an electroluminescent panel.

The square electroluminescent panels located behind the circular transparent areas within the die outlines are shown in FIG. 4 and include a backing conductive layer 43 and a corresponding translucent conductive layer 45. Sandwiched between conductive layers 43 and 45 is a layer of fluorescent dielectric material which will emit light when the conductors are energized with a 60 cycle signal. This light passes through translucent conductive layer 45 and is thus visible from the front of the panel. Electrical energy is applied to the electroluminescent panel through suitable leads connected to the conductive layers. These leads extend outwardly from one edge of the electroluminescent panel and are then bent back at right angles. Electroluminescent panel 34 located behind the words THIS IS THE HOUR is essentially the same as the panel shown in FIG. 4, except for size and shape.

FIG. 3 illustrates the structure of the electroluminescent panel which is located behind the transparent diamond shaped areas 24 of the minute indicating portion of the dice clock. This electroluminescent panel includes a circular conductive layer 45, and a circular fluorescent dielectric layer 46 secured thereto. Twelve wedge-shaped transparent conductive layer portions 47 are secured to the exposed surface of the dielectric material. These transparent conductive areas are each of the same size and shape, and are spaced so that there is no electrical connection between them. A lead 49 is connected to conductive layer 45, and a lead 48 is connected to each of the individual conductive layer portions 47. These leads extend radially outward from the electroluminescent panel and are then bent back at right angles. When lead 49 and a selected one of the leads 48 are energized by a suitable 60 cycle signal, the dielectric material adjacent the energized conductive layer portion becomes excited and emits light through the translucent conductive layer. Thus, it is possible to illuminate any selected one of the twelve segments of the circular electroluminescent panel shown in FIG. 3.

The individual electroluminescent panels are mounted on a printed circuit board 50 which includes a sheet of phenolic resin material having the same edge dimensions as Plexiglas front panel 21. The electroluminescent panels are mounted on the side of the printed circuit board which will be adjacent front panel 21 in the finally assembled unit. The conductors extending from the edges of the individual electroluminescent panels pass through pre-positioned holes in the printed circuit board and in this manner the individual electroluminescent panels are accurately aligned with the transparent areas of the front panel.

Figure 6:
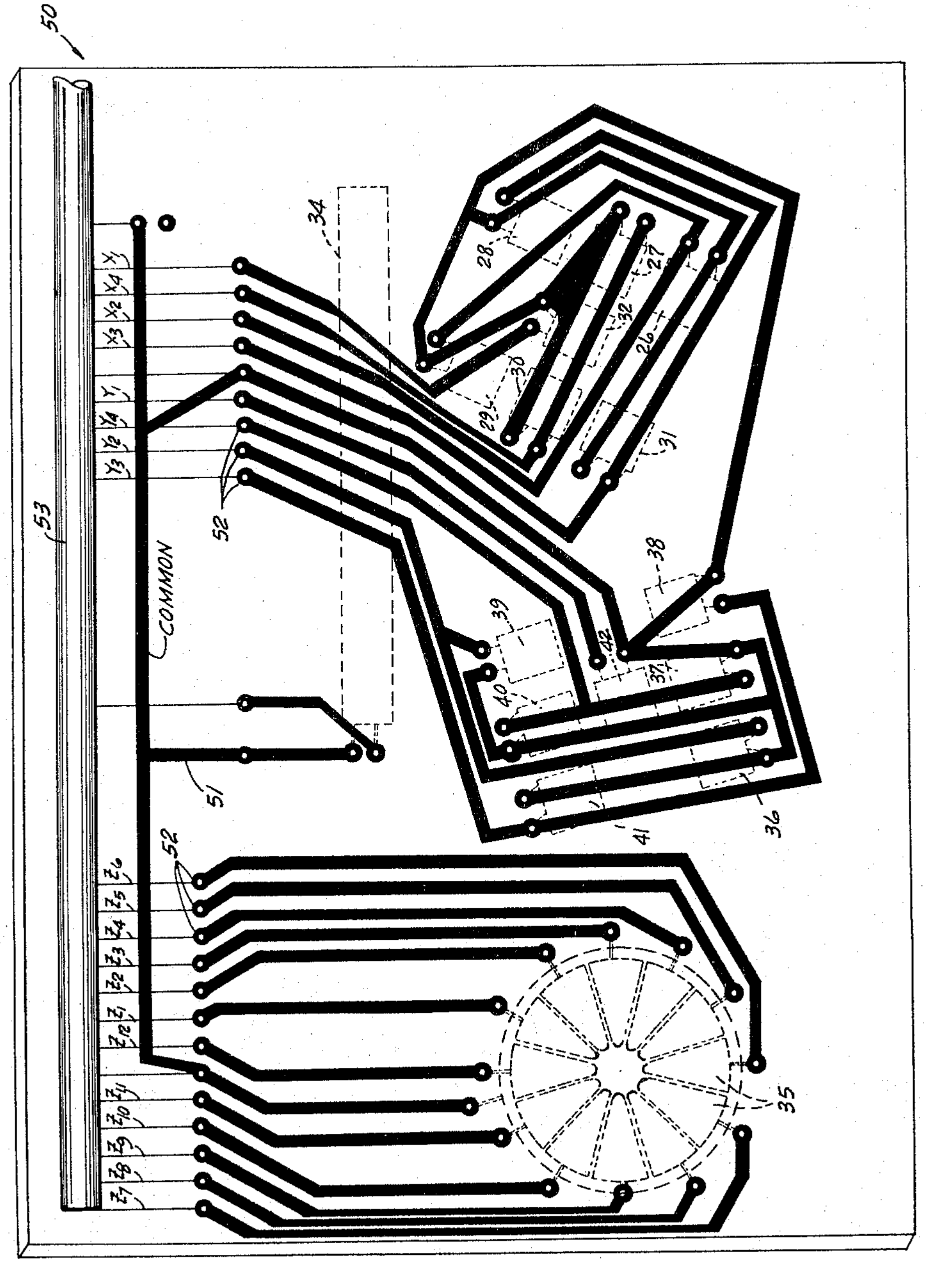
FIG. 6 is a perspective plan view showing the printed circuit board.

The electrical connections to the delicate electroluminescent panel leads are made to the free ends of the leads which emerge after passing through the printed circuit board. The layout for the printed conductors is shown in FIG. 6, the positions for the electroluminescent panels being shown in dotted lines. Conductor 51 is the electrically common conductor and is connected to the lead coming from the backing conductive layer of each of the individual electroluminescent panels. The other leads are individually coupled to various terminal points 52 where the conductors of a cable 53 are soldered to complete connections to the control circuits.

The use of the printed circuit board in the construction of the display unit has several definite advantages. As already mentioned, the holes in the printed circuit board provide a convenient way of accurately positioning the individual electroluminescent panels and maintaining them in their proper positions. The delicate leads extending from the electroluminescent panels, after passing through the printed circuit board, are simply bent over and then soldered to the printed conductor surrounding the hole thereby facilitating assembly line production. Also, it should be noted that the printed circuit board is laid out so that the wires of cable 53 are connected to a linear array of terminal points thereby saving time which otherwise would be required in seeking out the individual connection points.

The display unit is assembled as shown in FIG. 2. A sandwich is formed with Plexiglas front panel 21, a suitable plywood backing sheet 54, and the printed circuit board with the electroluminescent panels mounted thereon located between panels 20 and 54. The plywood backing sheet includes a suitable slot 55 through which cable 53 passes. Panels 21, 50 and 54 are mounted in a suitable frame 56 (FIG. 1).

It should be noted that the six different displays for each of the die can be achieved by means of only four conductors. With respect to die outline 17, a first conductor $X_1$ is coupled to center electroluminescent panel 32; a second conductor $X_2$ is coupled to electroluminescent panels 26 and 29 located in diagonally opposite corners of the die outline; a third conductor $X_3$ is coupled to electroluminescent panels 31 and 28 positioned in the other pair of diagonally opposite corners of the die outline; and a fourth conductor $X_4$ connects to the remaining pair of electroluminescent panels 27 and 30. Thus, as indicated by the chart in FIG. 9, a one is displayed on the die by energizing conductor $X_1$; a two is displayed by energizing conductor $X_2$; a three is displayed by energizing conductors $X_1$ and $X_2$ together; a four is displayed by energizing conductors $X_2$ and $X_3$; a five is displayed by energizing conductors $X_1$, $X_2$, and $X_3$; and a six is displayed by energizing conductors $X_2$, $X_3$ and $X_4$. Conductors $Y_1$–$Y_4$ are similarly connected to electroluminescent panels 36–42 and are energized in similar fashion.

*Control circuits*

Figure 7A:
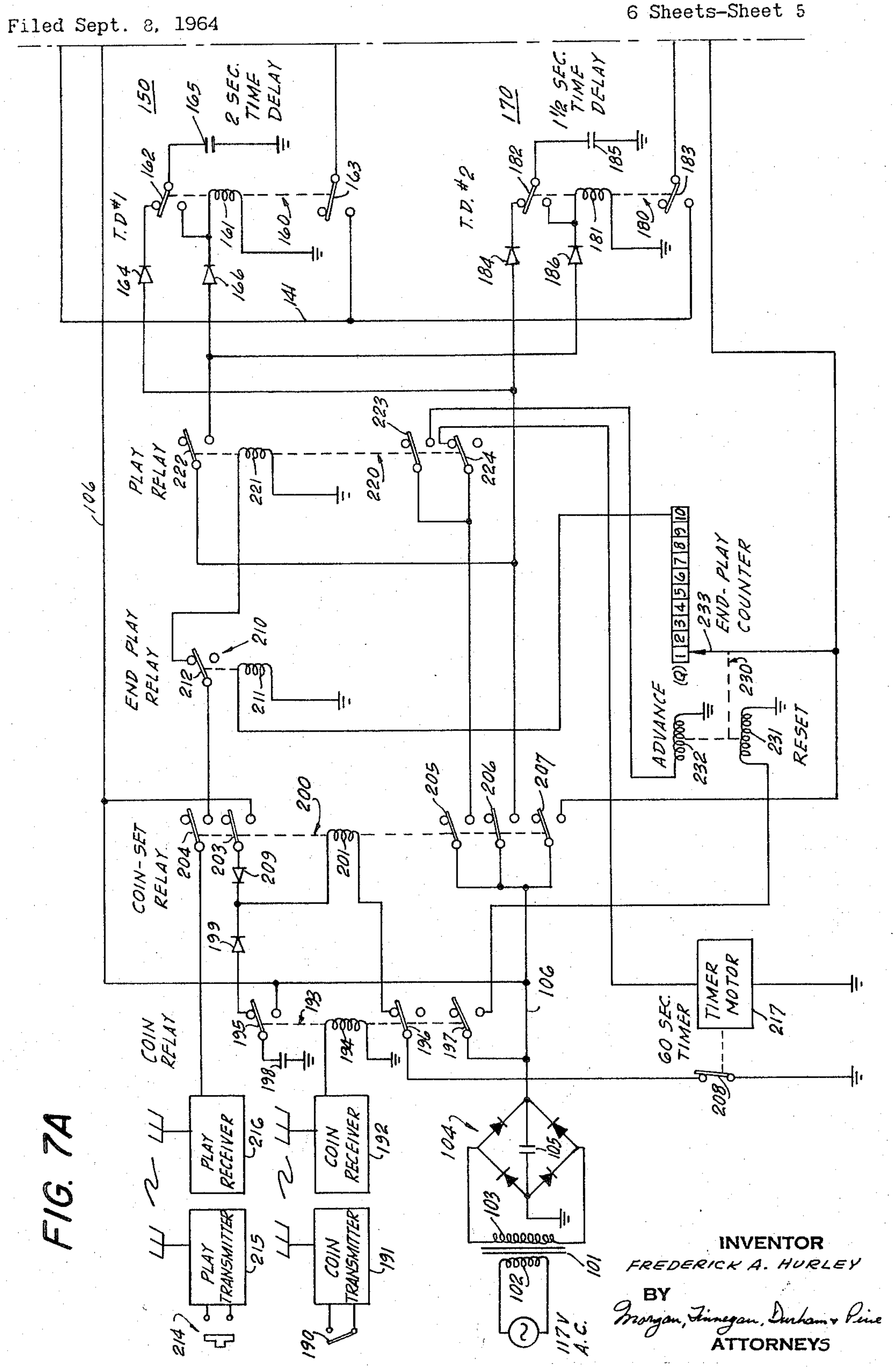
FIGS. 7A and 7B are parts of an interrelated schematic diagram of the electrical control circuits.
Figure 7B:
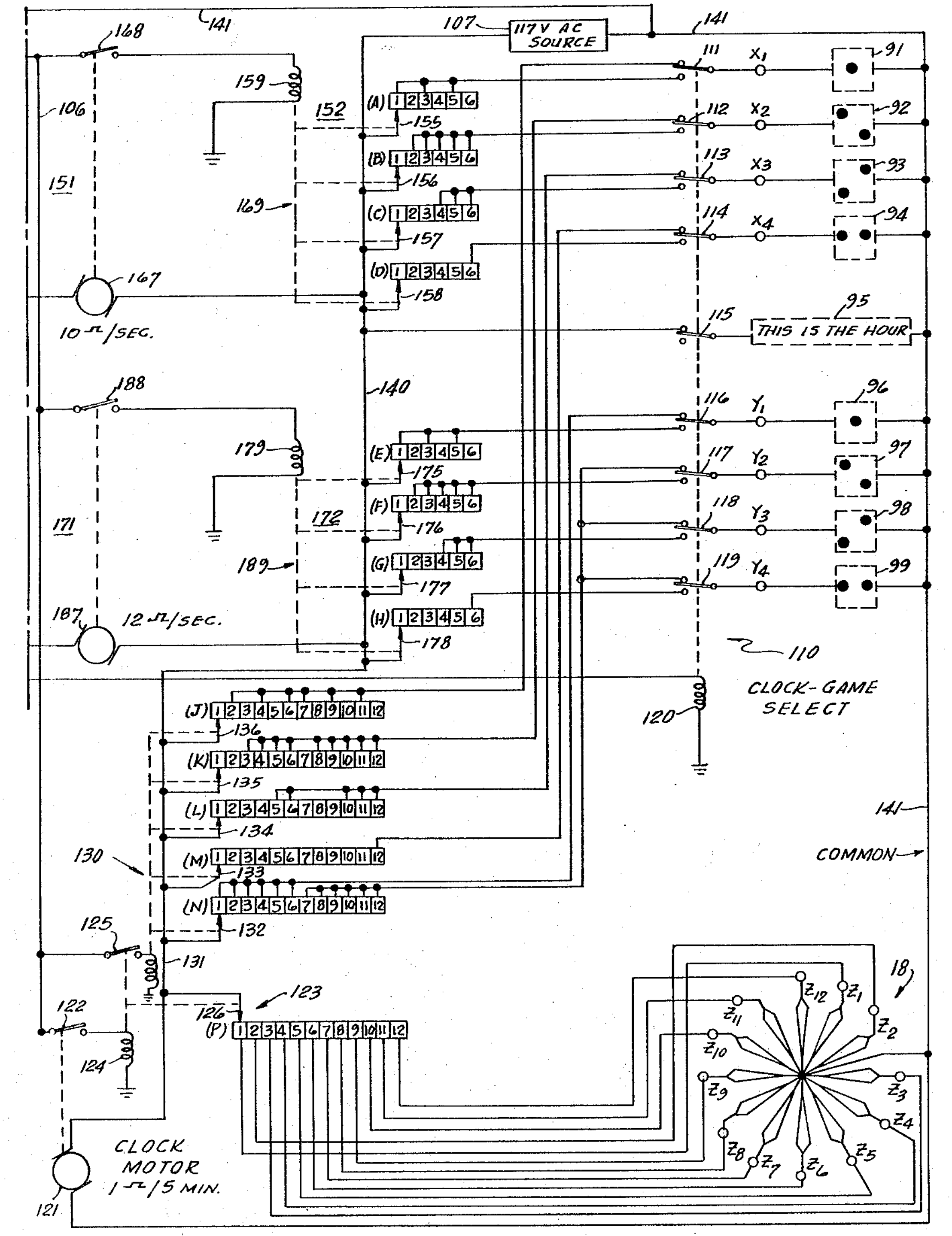

The control circuits are shown schematically in FIGS. 7A and 7B, which figures when placed together with FIG. 7A horizontally and FIG. 7B vertically, form a signal integrated schematic diagram.

The dotted line boxes 91–99 are used to indicate which portion of the front panel is illuminated when the various conductors $X_1$–$X_4$ and $Y_1$–$Y_4$ are energized. For example, when conductor $X_1$ is energized, the center dot of the first die (outline 17) is energized, when conductor $X_2$ is energized, the dots in one pair of diagonal corners are illuminated; when conductor $X_3$ is energized, the dots in the other pair of diagonal corners are illuminated; and when conductor $X_4$ is energized, the center pair of dots are illuminated. A similar relationship exists between conductors $Y_1$–$Y_4$ and the dots of the second die (outline 16). The radial pattern in the lower right hand corner of FIG. 7B represents the twelve possible positions of the clock minute hand, and a selected one of these radial portions is energized when one of the conductors $Z_1$–$Z_{12}$ is energized.

Relay 110 (FIG. 7B) is referred to as the clock-game select relay. When in its normal de-energized state as shown, the relay connects the clock control portion of the control system (shown in the lower portion of FIG. 7B) to conductors $X_1$–$X_4$ and $Y_1$–$Y_4$. Thus, when relay 110 is in the normal state, the clock control circuits control the dice indications appearing on the display unit, which indications represent the time of day. When relay 110 is in the energized state, it connects the game control circuit to conductor $X_1$–$X_4$ and $Y_1$–$Y_4$. Under these circumstances, the game control circuits control the dice indications on the display unit.

Electrical energy for the relay control circuits is provided from a power supply circuit including a transformer 101 having a primary winding 102 connected to a suitable alternating current source. The secondary winding 103 of the transformer is connected to a full-wave rectifier circuit 104 including four semiconductor diodes connected in conventional bridge circuit configuration. The negative output terminal of the power supply is connected to ground and the positive terminal is connected to a positive supply conductor 106. A capacitor 105 is connected between conductor 106 and ground to filter the power supply output. Energy for the various electroluminescent panels is supplied from the AC lines energized by a source 107 shown at the top of FIG. 7B.

*Clock control circuits*

The clock control circuits include a sychronous motor 121 connected across AC source 107 via conductors 140 and 141. The shaft of motor 121 is coupled to a camswitch arranged so that contacts 122 are closed momentarily once every five minutes. Contacts 122 are connected between positive conductor 106 and ground in series with an actuating winding 124 of a twelve position stepping switch 123. The stepping switch includes a circular array of twelve stationary contacts (shown linearly in the schematic diagram for convenience so that the associated wiper contact 126 advances through the twelve positions and then automatically repeats the sequence, each advance of the stepping switch being in response to a momentary closure of contacts 122. Stepping switch 123 includes a single bank of contacts with the individual contacts being designated $P_1$–$P_{12}$. Contacts $P_1$–$P_{12}$ are connected respectively to conductors $Z_1$–$Z_{12}$ which conductors in turn are connected to the twelve electroluminescent panel segments associated with clock face 18 (FIG. 1). Wiper contact 126 of the stepping switch is connected to one side of the AC source via conductor 140, and the common lead from electroluminescent panels 35 is connected to the other side of the AC source via conductor 141. With this arrangement, the minute hand on the clock face appears to advance in a clockwise direction in five minute increments.

Stepping switch 123 also includes a set of back contacts 125 which are closed momentarily each time stepping switch 123 advances from the twelfth position to the first position. Contacts 125 are connected between positive conductor 106 and ground in series with an actuating winding 131 of a twelve position stepping switch 130 having five banks of contacts designated J–N respectively. The contacts of stepping switch 130 are arranged in circular arrays so that the stepping switch advances digitally through twelve positions and then automatically repeats, each digital advance being in response to an energization of actuating winding 131.

When clock-game select relay 110 is in the normal de-energized state, contacts $J_2$, $J_4$, $J_6$, $J_7$, $J_9$ and $J_{11}$ are connected to conductor $X_1$ via movable contact 111; contacts $K_3$, $K_4$, $K_5$, $K_6$, $K_8$, $K_9$, $K_{10}$, $K_{11}$, and $K_{12}$ are connected to conductor $X_2$ via movable contact 112; contacts $L_5$, $L_6$, $Y_{10}$, $L_{11}$ and $L_{12}$ are connected to conductor $X_3$ via movable contact 113; contact $M_{12}$ is connected to conductor $X_4$ via contact 114; contacts $N_1$, $N_2$, $N_3$, $N_4$, $N_5$ and $N_6$ are connected to conductor $Y_1$ through movable contact 116; and contacts $N_7$, $N_8$, $N_9$, $N_{10}$, $N_{11}$, and $N_{12}$ are connected to conductors $Y_2$, $Y_3$, and $Y_4$ via movable contacts 117, 118 and 119 respectively.

When clock motor 121 is in operation, it produces twelve pulses per hour, and therefore advances the minute hand indication to complete a revolution in five minute increments. Upon completion of a revolution, contacts 125 close momentarily to thereby advance stepping switch 130 by one digital position, and hence, stepping switch 130 advances one position per hour. Thus, the twelve positions of stepping switch 130 correspond to the hour of the day and the dice indication presented on the display panel should likewise correspond to the hour of the day.

The manner in which this is achieved is illustrated in FIG. 8. The first vertical column shown in FIG. 8 designates the twelve possible positions, the second column indicates in which of these positions conductor $X_1$ is energized under control of the J contact bank, the third, fourth and fifth columns indicate respectively in which positions conductors $X_2$, $X_3$ and $X_4$ are energized under the control of contact banks K, L and M, the sixth column indicates in which positions the $Y_1$ conductor is energized under control of contact bank N, and the seventh column indicates in which positions conductors $Y_2$, $Y_3$ and $Y_4$ are energized under control of the contact bank N. The eighth vertical column indicates which of the conductors are energized for each of the various positions, and the ninth column shows the resulting dice display. It should be noted that the twelve separate dice indications are provided requiring only two numbers, namely, one and six, on the second dice. This arrangement permits the second dice to be controlled by means of a single bank of contacts, namely, contact bank N.

*Random selection circuits*

The control system in accordance with this invention includes two random selection circuits which, in this case, randomly select one out of six possible positions. One of these random selection circuits includes a time delay circuit 150 (FIG. 7A), a pulse generating circuit 151 (FIG. 7B) and a digital output selector 152.

Time delay circuit 150 includes a relay 160 having an actuating winding 161 and two sets of contacts 162 and 163. An associated capacitor 165 has a charging circuit which is completed through a diode 164 and contacts 162 in their normally closed position. Capacitor 165 is discharged to ground via contacts 162 and actuating winding 161 once the relay is initially placed in the energized state. Winding 161 is initially energized by means of a signal applied to the actuating winding via a diode 166. For convenience, this signal is referred to as the play pulse since, as will be described later, the duration of this signal corresponds to the duration of the player switch actuation.

Contacts 163 of relay 160 are connected in series with an AC motor 167 so that the motor is energized from AC source 107 via conductors 140 and 141 whenever relay 160 is in the energized state. A suitable cam (not shown) is coupled to the shaft of motor 167 and is operative to open and close associated contacts 168 at the rate of ten times per second.

The contacts of switch 168 are connected between positive conductor 106 and one end of an actuating winding 170, the other end of winding 170 being connected to ground. Winding 170 is the actuating winding of a stepping switch 169 which is the principal component of the digital output circuit 152. Stepping switch 169 is a six position switch including four banks of contacts designated A–D. The contacts of each bank are disposed radially so that the associated wiper contacts automatically repeat the six position sequence. When relay 110 is in the energized state, contacts $A_1$, $A_3$ and $A_5$ are connected to conductor $X_1$ via movable contact 111, contacts $B_2$–$B_6$ are connected to conductor $X_2$ via movable contact 112, contacts $C_4$, $C_5$, $C_6$ are connected to conductor $X_3$ via movable contact 113, and contact $D_6$ is connected to conductor $X_4$ via movable contact 114. Wiper contacts 155–158, associated with contact banks A–D respectively, are connected to AC source 107, via conductor 140, and, as previously mentioned, the electroluminescent panels represented by dotted line boxes 91–94 are connected to the other side of AC source 107 via a conductor 141. Thus, selected ones of the electroluminescent panels are energized via the contacts of stepping switch 169 to present a dice display coresponding to the stepping switch position.

The manner in which the numerical display is achieved on the face of the dice is illustrated in the chart shown in FIG. 9. The first vertical column of the chart indicates the positions of stepping switch 169, the second column indicates in which positions conductor $X_1$ is energized to illuminate one set of corner dots, the fourth column indicates when conductor $X_3$ is energized to illuminate the other pair of corner dots, and the fifth column indicates when conductor $X_4$ is energized to illuminate the center pair of dots. The sixth column indicates the display which appears on the face of the die and also indicates which ones of the conductors $X_1$–$X_4$ are energized to produce that display.

The operation of the random selection circuit is initiated by applying a play pulse to relay 160. Thus, the relay is maintained in the energized state by the player pulse, and thereafter is maintained in the energized state by the discharge of capacitor 165 through the actuating winding. Motor 167 is energized while relay 160 is in the energized state, and thus electrical pulses are provided to stepping switch 169 during this time interval. Stepping switch 169 advances one position in response to each successive pulse, and in this manner makes the final output selection.

The random selection circuit in accordance with this invention has been tested extensively and has been found to provide truly random results. One of the factors contributing to the random operation is that the length of time during which pulse generating circuit 151 provides pulses for advancing digital output selector 152 is in part controlled by the duration of the play pulse. This play pulse is determined by the length of time during which the player switch is actuated, and hence, this time duration will always vary to some degree which cannot be controlled by the player. The pulse generating period is also controlled in part by the capacitor discharge time. Since capacitor 165 never becomes fully charged or fully discharged, this time factor will also vary to some extent. Next, the pulse generating rate is sufficiently high so that the number of pulses supplied to output circuit 152 will vary significantly due to the relatively small variations in the time during which relay 160 is maintained in the energized state. Finally, it is significant that output selector 152 be digital in operation so that the output circuit will not tend to favor one position over other positions.

The second random selection circuit is substantially the same and includes components 170–189 corresponding respectively to components 150–169 in the first random selection circuit. The only significant difference between the two random selection circuits is that capacitor 185 is selected to provide approximately a one and one-half second time delay instead of a two second time delay, and pulse generating circuit 171 is designed to provide approximately twelve pulses per second instead of ten pulses per second. This is done to achieve non synchronous selections for the two die.

It should be noted that the random selection circuits in accordance with this invention can be used with a wide variety of different display systems. For example, the circuits can be used to select numbers for display in a bingo game or roulette wheel.

*Game control circuits*

The game control circuits convert the system from the clock operation to the dice game operation whenever coins of the proper denomination have been deposited via coin slot 14 (FIG. 1). While the game is in operation, the game control circuits couple the player switch associated with push button 15 (FIG. 1) so that the random selection circuits are energized in response to each actuation of the player switch. After a predetermined number of player switch actuations, the control circuits return from the game operation to the clock operation. Also, if the time interval between successive player switch actuations exceeds 60 seconds, indicating that the players have probably abandoned the game, the game control circuits automatically return to the clock operation.

Coin switch 190 (FIG. 7A) is part of conventional coin receiving unit and is associated with coin slot 14 (FIG. 1). The coin switch is connected to a coin transmitter 191 located in the remote control unit so that the transmitter sends out a radio signal to an associated coin receiver unit 192 located in unit 11 whenever switch 190 is momentarily closed. The output of receiver 192 is connected to an actuating winding 194 of a relay 193 referred to as the coin relay. Thus, when a coin of the proper denomination is deposited, switch 190 is closed momentarily so that transmitter 191 sends out a radio signal, and receiver 192 then energizes winding 194 in response to this radio signal.

Coin relay 193 is interconnected with a relay 200 referred to as the coin-set relay such that when the coin relay is momentarily energized, it will initially energize the coin set relay which thereafter remains in the energized state for the duration of the game operation.

A movable contact 195 associated with relay 193 is connected to one plate of capacitor 198 with the other plate of the capacitor being connected to ground. The normally open stationary contact associated with movable contact 195 is connected to the positive supply conductor 106, and the associated normally closed stationary contact is connected to one end of actuating winding 201 of coin-set relay 200 via a semiconductor diode 199. The other end of actuating winding 201 is connected to ground through normally closed contacts 196 of coin relay 193 connected in series with normally closed contacts 208 of a sixty second timer unit. The positive supply conductor 106 is also connectable to the non-grounded end of actuating winding 201 via normally open contacts 203 of relay 200 connected in series with a semiconductor diode 209 to thus provide a holding circuit for the coin-set relay.

Accordingly, when coin relay 200 is momentarily energized capacitor 198 is charged via movable contact 195. Thereafter, when the coin relay returns to its de-energized state, capacitor 198 is connected to actuating winding 201 via movable contact 195, and therefore, the capacitor is discharged through diode 199, winding 201, contacts 196 and contacts 208 to ground. As a result, coin-set relay 200 is initially energized, and is thereafter maintained in the energized state for the duration of the game operation by means of its holding circuit completed throuh contacts 203.

Player switch 214 is associated with push button 15 in the remote control unit (FIG. 1). Switch 214 is coupled to a relay 220, referred to as the play relay, via a second transmitter-receiver system. More specifically, switch 214 is connected to play transmitter 215 located in the remote control unit so that a signal is transmitted while the push button switch is actuated. The output of associated play receiver 216 is coupled to one end of actuating winding 221 of play relay 220 via normally opened contacts 204 of the coin-set relay and normally closed contacts 212 of a relay 210 referred to as the end play relay. The other end of actuating winding 221 is connected to ground. Thus, if the coin-set relay is energized and the end play relay is not energizable, which is the situation while a game is in play, play relay 220 is energized whenever push button switch 214 is actuated.

In FIG. 7A two separate transmitter-receiver systems are shown, one for coupling coin switch 190 to coin relay 193 and the other for coupling push button switch 214 to play relay 220. It should be pointed out that any two channel coupling system would suffice. For example, this could consist of a single transmitter-receiver system including a two channel pulse duration multiplex or modulation frequency multiplex. Where a portable remote control unit is not required, the coupling between the switches and the remaining control circuits can be accomplished by means of simple wire connections.

A sixty second timer unit including a timer motor 217 and an associated set of normally closed contacts 208 is utilized to return the system from the game operation to the clock operation when the time interval between successive player actuations exceeds sixty seconds. Positive supply conductor 106 is connected to one side of the timer motor via normally open contacts 205 of the coin-set relay connected in series with normally closed contacts 224 of the play relay, the other side of the timer motor being connected to ground. The timer motor is of the type which advances when energized and automatically returns to the initial position as soon as energization ceases.

Accordingly, the timer motor is energized when coin-set relay 200 is in the energized state and returns to the initial position each time play relay 220 is energized. Therefore, if the time interval between successive actuations of the play relay exceeds 60 seconds, the timer will open contacts 208 thereby de-energizing the holding circuit for coin-set relay 200. The return of the coin-set relay to the de-energized state terminates the game operation.

A stepping switch 230, referred to as the end play counter, is utilized to limit the number of plays permitted after the proper coins have been deposited. In this case the number of plays is limited to ten, but this is a matter of design. Stepping switch 230 is a ten position switch having a single bank of contacts designated Q. The associated wiper contact 233 advances one position each time the associated advance winding 232 is energized, and automatically returns to the initial position each time the associated reset winding 231 is energized. One end of each of windings 231 and 232 is connected to ground. Postive supply conductor 106 is connectable to the other end of reset winding 231 via normally open contacts 197 of the coin relay, and hence, the end play counter is reset each time a new coin is deposited. The positive supply conductor is connectable to the non-grounded end of advance winding 232 via normally open contacts 205 of the coin-set relay and normally open contacts 223 of the play relay. Thus, while coin-set relay 200 is energized during the game operation, the advance winding is momentarily energized to advance stepping switch 230 in response to each successive energization of play relay 220.

Wiper contact 223 of stepping switch 230 is connectable to positive supply conductor 106 via normally open contacts 207 of the coin-set relay. Contact $Q_{10}$ of stepping switch 230 is connected to ground via actuating winding 211 of end play relay 210. After ten successive actuations of the player switch, wiper contact 233 of the end play counter is in a position which energizes winding 211 via contact $Q_{10}$. Energization of end play relay 210 opens contacts 212 and prevents further energization of play relay 220. Therefore, within sixty seconds, the timer will open contacts 208 to de-energize coin-set relay 200 which in turn opens contacts 207 which returns end play relay 210 to the normal de-energized state. As previously mentioned, the game operation is terminated when the coin-set relay returns to the de-energized state.

Normally open contacts 207 of the coin-set relay are also connected in series with actuating winding 120 (FIG. 7B) of clock-game select relay 110, this series combination being connected between the positive supply conductor and ground. Therefore, while coin-set relay 200 is in the energized state, clock-game select relay 110 is also energized to thereby connect stepping switches 169 and 189 of the random selection circuits to conductors $X_1$–$X_4$ and $Y_1$–$Y_4$ respectively. When the coin-set relay is in its normal de-energized state, clock game select relay 110 is likewise in its de-energized state and therefore conductors $X_1$–$X_4$ and $Y_1$—$Y_4$ are connected to stepping switch 130 of the clock control circuits.

Although the invention has been described with respect to a specific embodiment describing a combined clock and dice game unit, it should be obvious that there are numerous uses for the various components therein and a large variety of different games and devices within the scope of the invention. For example, the random select circuits can be utilized in combination with any type of game wherein a random selection occurs such as a roulette game or games where the player's pieces advance in accordance with randomly selected number of squares. The clock portion of the system can be separated and operated merely as a clock. The dice game portion of the system can likewise be used separately. However, it should be obvious that there are also unique advantages achieved by means of the combined unit including the dice clock and the dice game. The invention is more particularly defined in the appended claims.

What is claimed is:

1. Combined clock and amusement apparatus comprising display means disposed for view by the players and presenting a pair of generally square outlines to represent the faces of two dice; a plurality of separately energizable electroluminescent members forming a part of said display means and being positioned so that selected areas within each of said outlines can be illuminated to represent the dots in their positions as they normally appear on the various faces of a die; player operated means actuatable by said players; first control means responsive to an actuation of said player operated means to energize selected ones of said electroluminescent members and thereby illuminate a randomly selected number of said areas within each of said outlines; timer means; and second control means connected to said timer means and said electroluminescent members, said second control means being operative, when the system is not being controlled by means of said player operated means, to energize selected ones of said electroluminescent members so that the total number of said areas which are illuminated is equal to the hour of the day.

2. Combined clock and amusement apparatus in accordance with claim 1 further comprising a coin-operated switch means, and circuit means operative in response to operation of said switch means to activate said first control means and to deactivate said second control means.

3. Combined clock and amusement apparatus in accordance with claim 2 further comprising means for counting the number of successive actuations of said player switch and for activating said second control means and deactivating said first control means after a predetermined number of such actuations.

4. Combined clock and amusement apparatus in accordance with claim 3 further comprising means for deactivating said first control means and activating said second control means prior to said predetermined number of actuations in the event that the period of time since the last previous actuation exceeds a predetermined period of time.

5. In a remotely controlled dice game, the combination of a display panel for providing two generaly square outlines representing the faces of two dice, said outlines being disposed for view by the players of the game; a plurality of separately energizable devices disposed to illuminate separate selected areas within said outline when energized; a remote control unit including means responsive to player actuations, and means operative to transmit a signal indicative of each player actuation; a control circuit associated with each of said outlines and operative in response to a received signal to randomly select one out of six possible selections; circuit means coupled between said control circuits and said devices to energize selected ones of said devices in accordance with the selection of the associated control circuitry; coin operated switch means; means operative to transmit a signal indicative of each switch actuation; an activation circuit means coupled to said control circuits and responsive to said signals indicative of switch actuations so that said control circuits are rendered operative only after said switch means has been actuated.

6. A remotely controlled dice game in accordance with claim 5 wherein said activation circuit means maintains said control circuits in an operative state for a predetermined number of player actuations subsequent to an actuation of said switch means.

7. A remotely controlled dice game in accordance with claim 5 wherein said activation circuit returns said control circuits to an inoperative state when the time interval between successive player actuations exceeds a predetermined value.

8. Amusement apparatus comprising display panel means disposed for view by the players and having thereon two generally square outlines representing two dice; a plurality of separately energizable electroluminescent devices disposed to, when energized, illuminate separate selected areas within said square outlines; means adapted for player actuation; a control circuit associated with each of said outlines, said control circuits each being operative to randomly select a number between one and six in response to a player actuation; and circuit means coupled between said control circuits and said electroluminescent devices so that the number of illuminated areas within one of said outlines corresponds to the number randomly selected by the associated control circuit; a timing device; and circuit means connectable to said electroluminescent devices and operative in response to said timing device to, by energizing the appropriate ones of said electroluminescent devices, indicate the hour of the day whenever there is an absence of player actuations.

9. In a remote controlled electrical dice game, the combination of:

- a relatively thin, substantially flat display panel disposed for view by the players;
- two generally square outlines on said panel representing two die;
- a plurality of electroluminescent panels located within each of said outlines and forming part of said display panel,
  - said electroluminescent panels being separately energizable to illuminate selected areas within said outlines to simulate various dice throws;
- remote control means including a player switch adapted for player actuation and a coin switch adapted for coin actuation;
- random selection control circuit means coupled to said player switch to randomly select one out of a plurality of numbers in response to each player actuation, said random selection control circuit means being coupled to said coin switch and made operative in response to coins being deposited;
- an AC source for energizing said electroluminescent panels; and
- circuit means for connecting selected ones of said electroluminescent panels to said AC source and for connecting said electroluminescent panels to said random selection control circuit means so that the number of illuminated areas corresponds to the randomly selected number and simulates a dice throw.

10. An electrical dice game in accordance with claim 9 wherein said generally square outlines are on a panel which is opaque except for seven selected transparent areas within each of said outlines, and wherein a separate electroluminescent panel is disposed behind each of said transparent areas.

11. A combination dice clock and chance device comprising a display panel disposed for view by players and having thereon two means each representative of a die, each means having spaced areas adapted to be illuminated when energized; means responsive to player actuation for energizing by chance certain of said spaced areas; timer means; control means connected to said timer means and said spaced areas, said control means being operative, when the device is not responding to player actuation, to energize selected ones of said spaced areas so that the total number of areas which are illuminated is equal to the hour of the day.

References Cited

UNITED STATES PATENTS

| | | | |
|---|---|---|---|
| 653,713 | 7/1900 | Thrasher | 58—23 |
| 1,872,372 | 8/1932 | Wensley. | |
| 2,008,408 | 7/1935 | Thompson. | |
| 2,012,544 | 8/1935 | O'Neil | 273—138 |

(Other references on following page)

UNITED STATES PATENTS

| | | | |
|---|---|---|---|
| 2,193,478 | 3/1940 | Diebel. | |
| 2,193,992 | 3/1940 | Vissing | 58—23 |
| 2,637,845 | 5/1943 | Craiglow | 340—345 |
| 2,679,398 | 5/1954 | Jameson | 273—138 |
| 2,881,892 | 4/1959 | Ylinen | 273—138 X |
| 2,922,993 | 1/1960 | Sack | 40—130 X |
| 3,186,158 | 6/1965 | Miller | 58—50 X |

OTHER REFERENCES

IBM Technical Disclosure Bulletin, vol. 6, No. 6, November 1963.

RICHARD C. PINKHAM, *Primary Examiner.*

ANTON O. OECHSLE, *Examiner.*

A. W. KRAMER, *Assistant Examiner.*